Oct. 31, 1967   J. G. BALMER, JR., ET AL   3,350,203
XEROGRAPHIC PLATE
Filed Jan. 24, 1964

INVENTORS
JAMES G. BALMER, JR.
ROBERT G. PLANTHOLT
BY
ATTORNEY

United States Patent Office 3,350,203
Patented Oct. 31, 1967

3,350,203
XEROGRAPHIC PLATE
James G. Balmer, Jr., Birmingham, and Robert G. Plantholt, Rochester, Mich., assignors to Xerox Corporation, Rochester, N.Y., a corporation of New York
Filed Jan. 24, 1964, Ser. No. 340,013
3 Claims. (Cl. 96—1.5)

ABSTRACT OF THE DISCLOSURE

A xerographic plate sandwich having a predetermined thickness to insure sufficient strength to prevent buckling or deformation. The plate has a peripheral strip that not only gives strength to, but provides a damage resistant edge along the plate. There is a honeycomb spacing material secured between two thin metallic plates to form a rigid composite plate with a high strength-to-weight ratio for prevention of deformation or damage while the plate is being handled either manually or in an automatic machine while insuring uniformity and evenness throughout the surface of the plate.

This invention relates to the field of xerography and, in particular, to a new and improved construction for a xerographic plate.

A xerographic plate comprises basically a conductive backing member with a photoconductive insulating layer or coating on one surface thereof. In the use of the xerographic plate, the plate is provided with a surface charge by suitable means such as, for example, by exposure to a high voltage electric charge after which it is exposed to a light image and then developed, for example, with an electroscopic powder. These steps and additional steps, such as cleaning, clamping and transporting of the plate by various plate handling devices, present conditions which result in mechanical damage or destruction to the plate with consequent loss of an otherwise still useable plate. With careful usage, the life of a plate will easily include many thousand xerographic or printing cycles. In order to experience long usage, it is obviously imperative that mechanical wear and damage be held to an absolute minimum.

Heretofore, xerographic plates have been constructed in two forms, depending for the most part upon the type of xerographic processing apparatus being utilized. For automatic xerographic processing, the xerographic plate is generally in the form of a cylindrical drum which rotates at a single position and does not require handling or movement about the apparatus to which it is a part. For manual operation of a xerographic apparatus where manual manipulation of the xerographic plate is required for processing, the plate takes the form of a relatively thin, flat plate having a frame structure made of wood for supporting the plate. Such a plate structure is illustrated and disclosed in U.S. Patent No. 2,619,418 to C. R. Mayo. However, the flat plate structure and attendant frame of the type disclosed in this patent is not suited for automatic processing in a xerographic apparatus having plate handling devices such as those disclosed in the patent to Crumrine et al., Patent No. 3,091,160.

The type of plate structure disclosed in the above referred to Mayo patent is too thin for the rough handling usually prevalent in automatic processing apparatus, which handling can produce unevenness and bending of the plate. In addition, the wooden frame would not readily lend itself to cooperation with plate handling devices which transport the plate from one processing station to another. The guide rollers and other guiding elements in these plate handling devices which are utilized to repeatedly engage the edges and the top and bottom surfaces of the plate adjacent the edges would eventually cause damage to the plate frame and the delicate photoconductive insulating layer on the surface of the plate. Even with manual handling of a xerographic plate, there is considerable opportunity for inadvertent bending of the plate which could impair the rather sensitive photoconductive layer, or at least, affect the flatness of the plate beyond the point where high quality development is possible.

In automatic xerographic processing apparatus, xerographic plates assume various positions and may be maintained on their edges or, in inverted positions or swung to assume other planes by actuating devices such as rollers, interponent members, latches, trip switches, and similar devices which engage or act upon the edges or outer surfaces of each of the plates.

In order to preserve the plate structure and, in particular, the photoconductive insulating layer on the plate from rough handling, which may cause such fraying and wearing of the plate edges as to render them incapable of efficient cooperation with the plate handling devices, and deflection of the plates that will cause peeling and cracking of the photoconductive layer, and loss of flatness of the layer, plates would have to be made from solid metallic material. Since spacing between a xerographic plate and a development electrode is critical, it is necessary to maintain the flatness of the plate to within very close tolerances in order to provide uniform development of the plate thereby insuring high quality development, especially for solid area coverage. In using such construction of solid heavy plates, especially in xerographic apparatus utilizing plates of relative size, the actuating or plate handling mechanisms for the plate must be correspondingly enlarged in order to readily handle the relatively heavy weighted plates.

Therefore, it is the principal object of the present invention to improve the construction of xerographic plates in a manner to increase strength and ruggedness for use in xerographic processing apparatus while maintaining the weight of the plates at a minimum.

It is another object of the present invention to improve the construction of a xerographic plate in order to endow the plate with the property of having a relatively high strength-to-weight ratio while still maintaining constant the relative thickness of the plate and the flatness of the photoconductive layer.

Further advantages and objects of the invention will become apparent when taken in conjunction with the accompanying drawing wherein.

Figure 1:
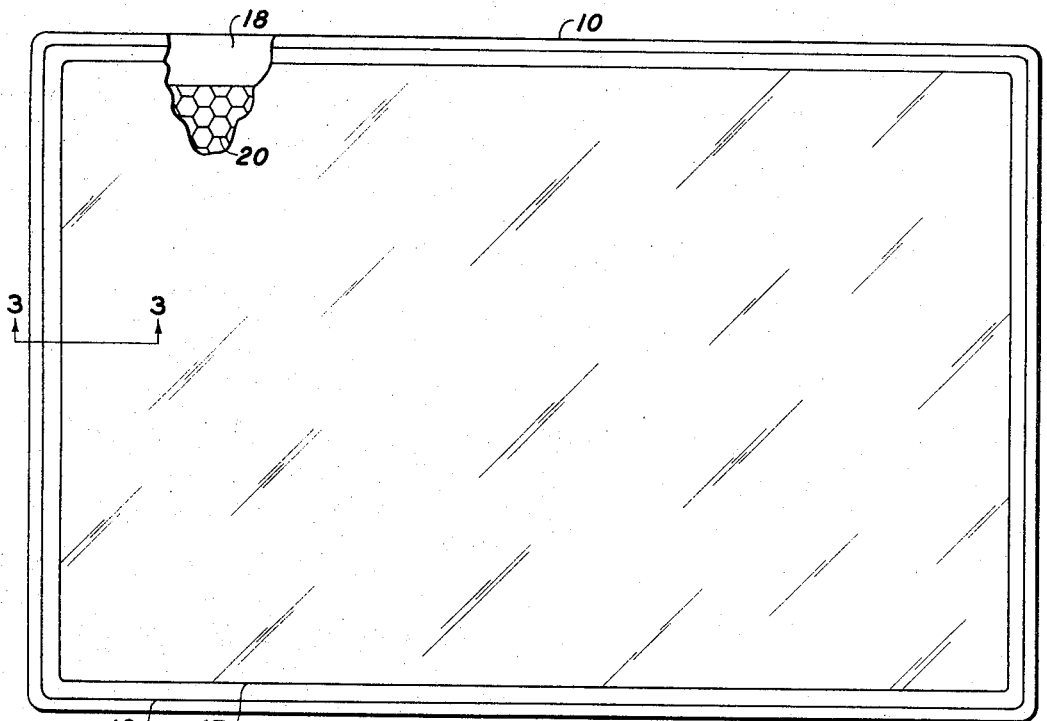
FIGURE 1 is a perspective view partially in section of a preferred xerographic plate according to the principles of the invention.
Figure 2:
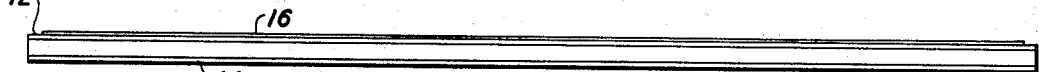
FIGURE 2 is an end view of the plate taken along the length thereof.

Referring to the drawing, there is shown in FIGURES 1 and 2 a xerographic plate 10 comprising two relatively thin, parallel arranged, plate members 12 and 14 upon which a xerographic plate 16 is cemented by a suitable adhesive. The plate members 12 and 14 are made from suitable conductive material such as, for example, aluminum, to render the plate conductive. Deposited upon the plate member 16 is the photoconductive insulating layer 17 which may be one of various suitable materials including vitreous selenium or mixtures of selenium and sulphur, various photoconductive phosphors, such as zinc oxide, either as a continuous layer or as discrete particles in a resinous binder.

Figure 3:
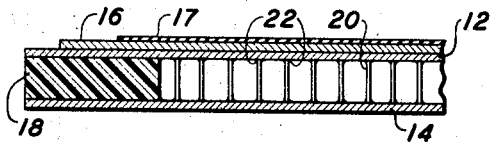
FIGURE 3 is a partial cross-section of a portion of the plate illustrated in FIGURE 1, taken along the line 3—3.

The plate members 12 and 14 are separated in spaced relationship by a strip of material 18 sandwiched between the members along the outer edges thereof. As shown in FIGURES 2 and 3, the strip 18 is much thicker than the plate members and is in alignment with the outer edges thereof, thereby presenting a relatively large edge surface for cooperative action with drive rollers and also for receiving impacts caused by handling of the xerographic plate 10. Preferably, the strip 18 is made from a high-impact resistant, thermoplastic material such as "Implex" or other similar material such as "nylon" in order to provide a very rugged border surface for cooperation with the plate handling devices of a xerographic apparatus.

Between the plates 12 and 14 and within the confines of the strip 18 is a spacing member 20, which, for the embodiment of FIGURE 1, is metallic, preferably aluminum of honeycomb configuration. The honeycomb structure is secured to each of the plates by an epoxy material, indicated in FIGURE 3 by the fillets 22, in order to maintain the plates 12 and 14 in conductive contact and thereby maintain the electrical conductive capability of one of the plates to the other and to provide a unified support structure which is relatively thick, but light in weight. The use of epoxy material for the purpose of securing the spacing member 20 and the plates 12, 14 is preferable since this material is adapted to harden or set without releasing solvent vapors. This permits easy fabrication of the xerographic plate since all of the parts of the plate may be assembled in a single operation without fear that vapor will be generated and become unvented within the closed space between the plate members. Use of a solvent evaporative adhesive would not be feasible since this type of adhesive will not properly set under these conditions and the high bond strength between the parts of the plate will not be achieved.

The spacing member 20, when secured to the plate members 12 and 14, provides a composite structure which is light in weight but high in strength. The use of high-impact resistant material for the strip 18 provides a bumper for the xerographic plate which will not deform as readily as a metallic bumper and will be lighter in weight than a metallic bumper of equal size. In combination with the honeycomb structure positioned between and secured to the plate members, the strip 18 insures that the plate members 12 and 14 will be maintained in parallelism and that the xerographic plate will maintain its exact thickness throughout its entire length. This combination also resists forces which will tend to deflect or bend the plate, say, for example, caused by drive rollers engaging the edges of the plate which are slightly offset from each other. By withstanding the forces tending to deflect or bend the plate, close tolerances for flatness of the surface of the plate upon which the photoconductive layer is deposited will be maintained.

Being relatively lightweight compared with its size and strength, the effect of the addition of its own weight to the forces causing deformation is minimized, that is, if the plate is solid metallic and is dropped, the weight of the plate will be added to the deformation and bending that result when the plate strikes an object. On the other hand, with the present invention, the plate being light and having a high strength-to-weight ratio, the dropping of the plate will not deform the plate to cause bending thereof.

Figure 4:
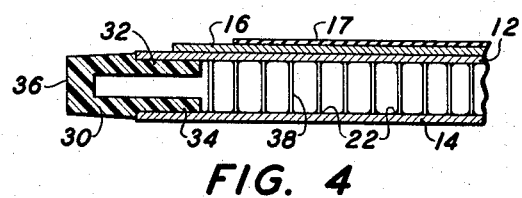
FIGURE 4 is a partial cross-section of a portion of another embodiment of the invention.

The xerographic plate in the embodiment of FIGURE 4 includes the two plate members 12, 14 and the xerographic plate 16 with the photoconductive layer 17 thereon; however, it is provided with a modified edge surface which extends beyond the extreme outer edges of the plate members. In this embodiment, a strip 30, of the same material as strip 18 in FIGURE 1, having a U-shaped cross-section is arranged so that the edges of the plate member 12, 14 are secured to the side elements 32, 34, respectively, of the strip at points intermediate the width thereof. The outer edge 36 of the channel shape strip 30 is highly polished and is adapted to engage drive rollers, latches, trip switches, and the like during use in xerographic apparatus. Between the plate members 12, 14 of the plate illustrated in FIGURE 4, is a metallic honeycomb structure 38 that is secured in conductive relationship to the adjacent interior surface of the plate members. The effects of external impacts directed toward the edges of the xerographic plate from a direction in the plane of the plate or at angles thereto will be minimized.

From the foregoing description it may be noted that a form of the invention has been described as applicable for providing a relatively large xerographic plate having a large strength-to-weight ratio. While the present invention, as to objects and advantages, has been described herein as carried out in two specific embodiments thereof, it is intended to cover the invention broadly within the scope of the appended claims.

What is claimed is:

1. A xerographic plate structure comprising:
   first and second plate members;
   a photoconductive insulating layer supported on one surface of a first of said members;
   a strip of material secured to and between the side of the first plate member opposed to that having said layer and said second plate member along the edges thereof;
   said strip having an edge extending at least contiguous to the edges of said plate members for protecting the latter edges against impacts directed toward said edges; and
   a spacing member positioned between said plate members and within the confines of said strip material and being adapted to space said plate members a predetermined distance;
   said strip having a thickness equal to said predetermined distance and being cooperable with said spacing element to maintain the thickness and the flatness of the xerographic plate uniform throughout its entire surface.

2. A xerographic plate structure having the properties of being relatively thick and lightweight thereby possessing a high strength-to-weight ratio comprising:
   a first conductive plate member;
   a photoconductive insulating layer supported on one surface of said member;
   a second conductive plate member;
   a strip of material secured to and between the side of the first plate member opposed to that having said layer and said second plate member along the edges thereof;
   said strip having an edge extending to the edges of said plates for protecting the latter edges against impacts directed toward said edges; and
   a conductive spacing member positioned between said plates and within the confines of said strip material and being adapted to space said plate members a predetermined distance;

said spacing member having a thickness equal to said predetermined distance and being cooperable with said strip to maintain the thickness and the flatness of the xerographic plate uniform throughout its entire surface.

3. The apparatus of claim 1, wherein said strip of material includes a resilient edge extending at least to the edges of said plates for protecting the latter edges against impacts and preventing deformation of said strip and said plates.

References Cited

UNITED STATES PATENTS

| | | | |
|---|---|---|---|
| 1,475,963 | 12/1923 | Osterlind | 101—382 |
| 2,277,013 | 3/1942 | Carlson | 96—1 X |
| 2,619,418 | 11/1952 | Mayo | 95—1.7 X |
| 2,711,481 | 6/1955 | Phillips | 96—1 X |
| 2,814,989 | 12/1957 | Sites | 101—382 |
| 3,182,573 | 5/1965 | Clark et al. | 95—1.7 |

NORMAN G. TORCHIN, *Primary Examiner.*

C. E. VAN HORN, *Assistant Examiner.*